United States Patent
Brunson et al.

(10) Patent No.: US 8,010,677 B2
(45) Date of Patent: Aug. 30, 2011

(54) ALTERNATIVE BANDWIDTH MANAGEMENT ALGORITHM

(75) Inventors: Gordon Brunson, Broomfield, CO (US); Chandra Ravipati, Thornton, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 12/629,702

(22) Filed: Dec. 2, 2009

(65) Prior Publication Data

US 2011/0131331 A1 Jun. 2, 2011

(51) Int. Cl.
G06F 15/173 (2006.01)
(52) U.S. Cl. ......... 709/226; 709/223; 709/224; 709/225
(58) Field of Classification Search .................. 709/223, 709/224, 225, 226
See application file for complete search history.

(56) References Cited

U.S. PATENT DOCUMENTS

| | | | |
|---|---|---|---|
| 6,233,223 B1 | 5/2001 | Sabry et al. | |
| 2003/0236887 A1* | 12/2003 | Kesselman et al. | 709/226 |
| 2004/0151166 A1 | 8/2004 | Tsukagoshi et al. | |
| 2005/0188073 A1 | 8/2005 | Nakamichi et al. | |
| 2007/0106774 A1* | 5/2007 | Yokota et al. | 709/223 |
| 2007/0294410 A1* | 12/2007 | Pandya et al. | 709/226 |
| 2008/0052387 A1* | 2/2008 | Heinz et al. | 709/223 |
| 2008/0052393 A1* | 2/2008 | McNaughton et al. | 709/224 |
| 2009/0070454 A1* | 3/2009 | McKinnon et al. | 709/224 |
| 2009/0271512 A1* | 10/2009 | Jorgensen | 709/224 |
| 2010/0094986 A1* | 4/2010 | Zuckerman et al. | 709/223 |

FOREIGN PATENT DOCUMENTS

| | | |
|---|---|---|
| EP | 1806875 | 7/2007 |
| EP | 1953994 | 8/2008 |

OTHER PUBLICATIONS

U.S. Appl. No. 12/554,714, filed Sep. 4, 2009.
Background of the Invention for the above-captioned application (provided Dec. 2, 2009).
Carter et al. "Server Selection Using Dynamic Path Characterization in Wide-Area Networks," INFOCOM '97. Sixteenth Annual Joint Conference of the IEEE Computer and Communications Societies. Driving the Information Revolution Apr. 7, 1997, vol. 3, pp. 1014-1021.
Extended Search Report for European Patent Application No. 10181563.7, dated Dec. 3, 2010.

* cited by examiner

*Primary Examiner* — Le Luu
(74) *Attorney, Agent, or Firm* — Sheridan Ross P.C.

(57) ABSTRACT

Methods, systems, and devices are provided that propose allocating bandwidth in a distributed network. According to a decentralized mode of operation, bandwidth between network devices is cooperatively shared and managed, allowing one or more call processing modules to selectively and intelligently place calls or perform activities. A single authoritative mode of operation for a given communication link is also provided, wherein one or more network devices may consult an authoritative member to determine if sufficient bandwidth is available to support an activity. Various triggering events or conditions may facilitate the transition from one mode to another. Audits or accountings are conducted, wherein devices may update or synchronize information stored in a control table related to system bandwidth.

18 Claims, 7 Drawing Sheets

ALTERNATIVE BANDWIDTH MANAGEMENT ALGORITHM

FIELD

The present invention is directed generally to communication systems, and more particularly to bandwidth management mechanisms.

BACKGROUND

An enterprise call system or a call center may receive thousands of calls within a given day. The calls may be received at a plurality of distributed locations. Each call to such a location or destination requires a certain amount of bandwidth from the network that carries the call. However, network bandwidth is often constrained in one or more communication links. Accordingly, with each call, a system or component in the network must determine whether there is enough unused or available bandwidth to handle each call.

Several arrangements known in the art facilitate the allocation or distribution of bandwidth. More particularly, various methods and devices have been developed that facilitate the management of a communication link having constrained bandwidth. In some arrangements, a central system maintains a calculation or estimate for the amount of bandwidth available on a given communication link. As each call controller receives a request for a new call, the call controller queries the central system whether sufficient bandwidth exists on a particular communication link to proceed with the phone call. As will be appreciated, such a centralized approach bears numerous disadvantages compared to a decentralized method. By way of example, as the network becomes more diverse with several call controllers and multiple communication links, the process of requesting bandwidth information for each link from the central system becomes inefficient and creates excessive network traffic. In addition, should the central system become disabled or unavailable, no other component in the network can determine whether the desired bandwidth is available. Still further, scalability problems may accrue when the system or network becomes large.

SUMMARY

U.S. patent application Ser. No. 12/554,714, the entire contents of which are hereby incorporated herein by reference, describes an improved system and method for bandwidth allocation, wherein each of a plurality of call processing servers or modules maintains its own records for bandwidth available on a particular communication link. Specifically, the '714 patent application describes a distributed bandwidth management scheme whereby each call processing server assumes ownership of a fraction of the total amount of bandwidth available on a particular communication link. Each call processing server can manage calls based on this fractional amount of bandwidth available. In general, each call processing server may route calls over a given communication link by only referring to the bandwidth it is allocated.

The amount of bandwidth allocated for a particular communication link to all call processing servers never exceeds the total bandwidth available on that communication link. This ensures that as long as each call processing server does not over-utilize its own allocated bandwidth, a sufficient amount of bandwidth will always be available on the communication link. The '714 patent application also proposes mechanisms that allow each call processing server to allocate some of its bandwidth to a requesting call processing server.

As will be appreciated, the solution described in the '714 patent application offers several improvements over the centralized approach described above, in part because each member can request bandwidth from any other member, rather than only from a central system. However, this solution may not be optimal or desirable in all cases. For example, a call processing server or module may in certain cases become overwhelmed with requests for bandwidth, consuming processing resources. For example, a request for additional bandwidth may need to be communicated to several members in order to gather sufficient bandwidth, which may not be a desirable use of system resources. Further, the reallocation or sharing of assigned bandwidth between call processing servers can increase the inter-server signaling, which can be costly and somewhat inefficient. The latter is particularly problematic when servers are geographically disparate (e.g., a transoceanic link connects the geographically disparate servers), as the additional bandwidth used for the bandwidth requests and allocation signaling may become prohibitively expensive.

Embodiments of the present invention propose an alternative algorithm or set of algorithms for managing constrained bandwidth with a distributed set of call control servers.

One aspect of the present invention is to provide an alternative algorithm to the algorithm presented in the '714 patent application. Particularly, the total bandwidth of a remote location is not "split" among the various call control servers which are capable of routing a call to the remote location. Rather, each call control server maintains its own independent accounting of the total bandwidth available at the remote location and each call control server will increment its own accounting of bandwidth utilization based on the calls that it is personally responsible for routing to the remote location. Thus, each call control server independently tracks the amount of bandwidth it causes to be consumed.

On a periodic basis or after a predetermined trigger event has occurred, an auditing process is executed whereby the call control servers share bandwidth information to inform all other call control servers of what they currently have calculated for the current bandwidth utilization. This causes each call control server to re-synchronize its accounting of bandwidth utilization for a remote location. This allows each call control server to know precisely the bandwidth utilization at some point in the past. The accuracy of each call control server's accounting of the bandwidth utilization will vary depending upon how frequently the auditing process is performed, but the invention is not limited to any particular periodicity.

By knowing the bandwidth utilization perfectly, each call control server is allowed to control calls and maintain its own table independently. This ultimately means that the call control servers will not need to "share" bandwidth with other call control servers when one of the call control servers runs out of allocated bandwidth. While there is some remaining uncertainty of current bandwidth utilization, the uncertainty can be minimized by intelligently selecting the frequency with which the auditing process occurs. One factor that may be considered when selecting this frequency is the call rate for the remote location (i.e., the call rate for a particular communication link connecting the remote location to the larger communication network). Also, the uncertainty may be outweighed by the savings of not needing to "share" bandwidth.

Another aspect of the present invention is to provide a mechanism which causes the call control servers to switch from their distributed mode of bandwidth management to a temporary but single authoritative master mode of bandwidth management. When it is determined that the bandwidth utilization exceeds a certain threshold (e.g., 90% of total available bandwidth), the call control servers can cooperatively transition to the single authoritative master mode of bandwidth management. In the single authoritative master mode of bandwidth management a single call control server becomes responsible for routing further calls to/from the remote location over the communication link having constrained bandwidth. If any other call control server needs to route a call to the remote location, then that call control server will forward the request to the authoritative call control server responsible for that remote location/communication link.

This single authoritative master mode of operation is maintained in force until the bandwidth utilization falls below a second threshold, which is not necessarily the same as the first threshold. Once bandwidth utilization falls below this threshold, then the distributed bandwidth management protocol is reinstated. In accordance with at least some embodiments of the present invention a method is provided that generally comprises:

receiving, at a first server, a request from a communication device to establish a communication session over a communication link thereby utilizing bandwidth of the communication link, wherein the communication link comprises a fixed available bandwidth;

allowing the communication device to establish the communication session over the communication link;

updating, by the first server, an accounting of available bandwidth for the communication link in a locally maintained control table; and performing, by the first server, a synchronization process, wherein during the synchronization process the first server shares its accounting of available bandwidth for the communication link with a second server that is also capable of establishing communication sessions over the communication link, wherein while operating in a decentralized mode of bandwidth management and other than during the synchronization process the first server does not share its accounting of available bandwidth for the communication link with the second server and the second server does not share its accounting of available bandwidth for the communication link with the first server.

As used herein, the phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means any of: A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

DETAILED DESCRIPTION

For purposes of explanation, numerous details are set forth in order to provide a thorough understanding of the present invention. It should be appreciated, however, that the present invention may be practiced in a variety of ways beyond the specific details set forth herein.

The invention will be illustrated below in conjunction with an exemplary communication system. Although well suited for use with, e.g., a system using a server(s) or database(s), the invention is not limited to use with any particular type of communication system or configuration of system elements. Those skilled in the art will recognize that the disclosed techniques may be used in any environment in which it is desirable to manage bandwidth on one or more communication links having constrained bandwidth availability. To avoid unnecessarily obscuring the present invention, the following description omits well-known structures, components and devices that may be shown in block diagram form, are well known, or are otherwise summarized.

Figure 1A:
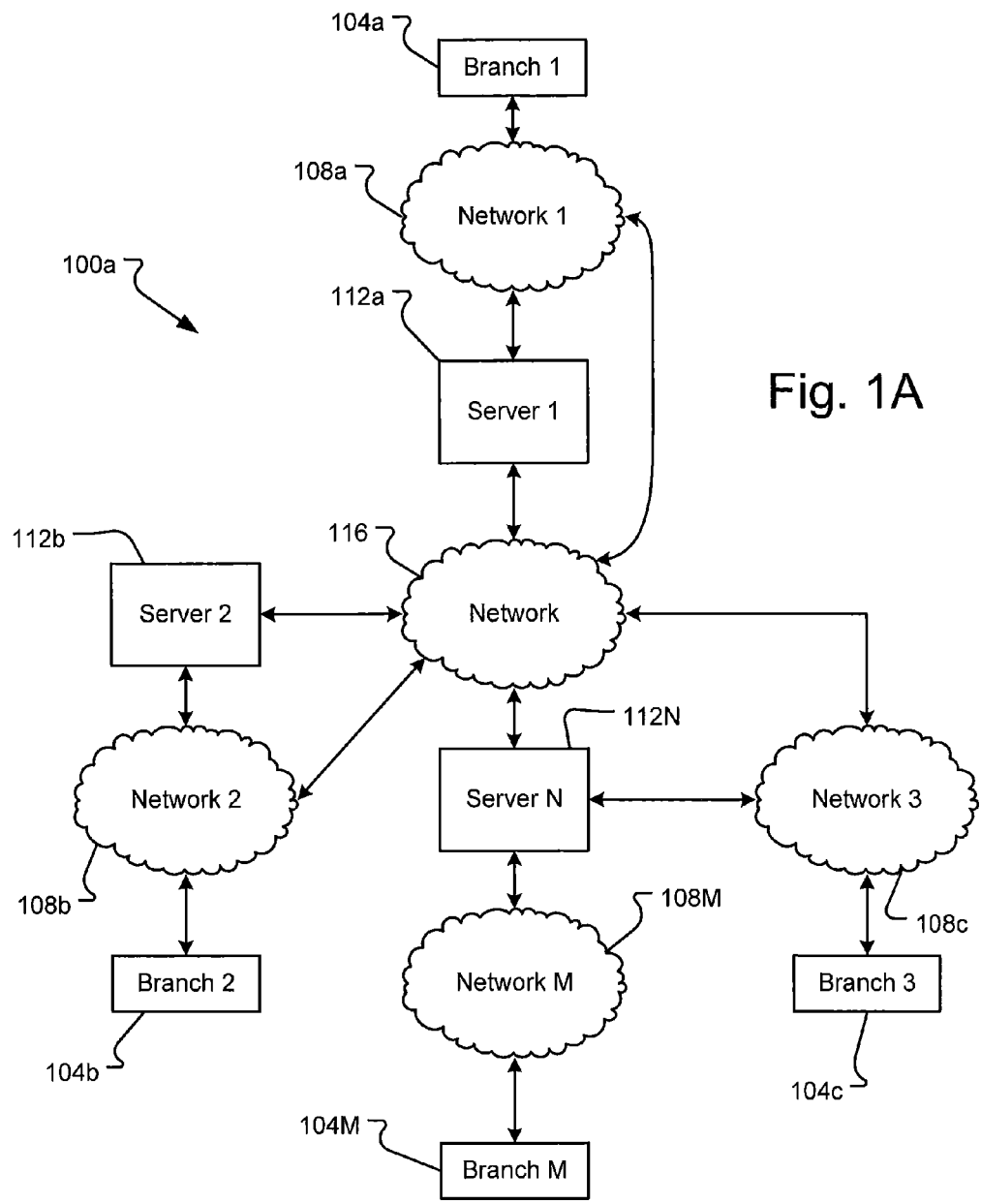
FIG. 1A is a block diagram of a communication system in accordance with at least some embodiments of the present invention.

Referring now to FIG. 1A, an embodiment of a communication system 100a is depicted. The several components included in the system 100a may be hardware, software, or a combination of hardware and software. According to some embodiments, a plurality of servers 112a-N are provided. The servers 112 are generally operable to administer calls and other bandwidth consuming activities (e.g., Virtual Private Network (VPN) links, Voice over Internet Protocol (VoIP) calls, video calls, data calls, multimedia communication sessions, or the like) between communication endpoints (e.g., phones, computers, laptops, servers, cellular phones, etc.).

Generally speaking, each server 112 may manage bandwidth consuming activities for a number of different branches 104a-M. One or more communication links connecting a branch 104 to the enterprise communication network 116 may comprise a limited available bandwidth. In accordance with at least some embodiments of the present invention, a local communication network 108 between a branch 104 and the servers 112 may be owned and operated by a network service provider (e.g., an Internet Service Provider (ISP)). The amount of bandwidth available between any branch 104 and the rest of the communication system 100a may be purchased from the network service provider by the enterprise or administrator of the enterprise network.

In accordance with at least some embodiments of the present invention, the enterprise may elect to purchase only a fixed amount of bandwidth in an attempt to minimize operating costs. This results in a limited available bandwidth for a communication link traversing the network 108 and terminating at the branch 104. While multiple calls and other bandwidth consuming activities can be simultaneously established over this communication link, the total amount of bandwidth available on the communication link is limited. This means that the total number of bandwidth consuming activities that may be simultaneously established over the communication link is limited. Accordingly, the servers 112a-N are adapted to manage the bandwidth on these various communication links either according to a decentralized management mode or a single authoritative management mode.

In accordance with at least some embodiments of the present invention, the number of servers 112 is not equal to the number of branches 104 and/or networks 108. Specifically, the number of branches and local communication networks M may be greater than the number of servers N. For example, FIG. 1A depicts a server 112N in communication with local branches 104M and 104c. This is not a requirement, however, and it may be possible to have a system configuration whereby the number of servers N equals or is greater than the number of branches and local networks M. The number of branches 104 may also be larger than the number of local networks 108, meaning that a single local network 108 may service more than one branch 104.

A branch 104 may include a set of multiple communication devices, such as telephones, computers, laptops, and so on. For example, a branch 104 may be part of a call center, or a site of an enterprise network. The branches 104 may be a collection of Internet Protocol (IP) addresses or telephone numbers. The branches may or may not feature a Private Branch Exchange (PBX). Locations without a PBX may only be accessible through IP links. According to some embodiments, branches are accessed in part through a central network 116. According to still other embodiments, a decentralized network is provided, whereby a server may directly access any other branch without invoking the functions of another server. As an example, a first server 112a may be adapted to route a call to a second location or branch 104b via networks 116 and 108b without necessarily invoking the second server 112b.

The networks 108a-M or 116 can be any trusted or untrusted network that allows for the communication of data between branches 104a-M and servers 112a-N. Generally, the network 108a-M or 116 may comprise any type of known communication medium or collection of communication mediums, and may use any type of protocols to transport messages. The network may include wired and/or wireless communication technologies; The Internet is an example of a communication network that constitutes an IP network consisting of many computers, computing networks, and other communication devices located all over the world, which are connected through many telephone systems and other means. Other examples of exemplary networks include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a cellular network, and any other type of packet-switched or circuit-switched network known in the art. In addition, it can be appreciated that the network 108a-M1 or 116 need not be limited to any one network type, and instead may be comprised of a number of different networks and/or network types. Moreover, the network 108a-M1 or 116 may comprise a number of different communication mediums such as coaxial cable, copper cable/wire, fiber-optic cable, antennas for transmitting/receiving wireless messages, and combinations thereof.

In FIG. 1A, phone calls or requests for bandwidth from one or more IP addresses at one or more branches 104 may be coordinated. As an example, a phone call may be desired to be placed to the first branch 104a. The request may be sent to the first server 112a over the network 116 by either the second server 112b or Nth server 112N. However, before allowing the call, it is desirable that the requesting server determine if the first network 108a has sufficient bandwidth to support the call, often requiring the requesting server to have some estimate of the available bandwidth on the communication link connecting the first branch 104a to the rest of the communication system 100a. According to various embodiments, the server 112 attempting to establish the call connection may consult a locally stored and maintained control table to determine if sufficient bandwidth is available before placing the call. According to still other embodiments, an authoritative mode is provided, wherein a server 112 attempting to establish a call connection consults an authoritative server for bandwidth availability on the desired communication link before completing a call.

Figure 1B:
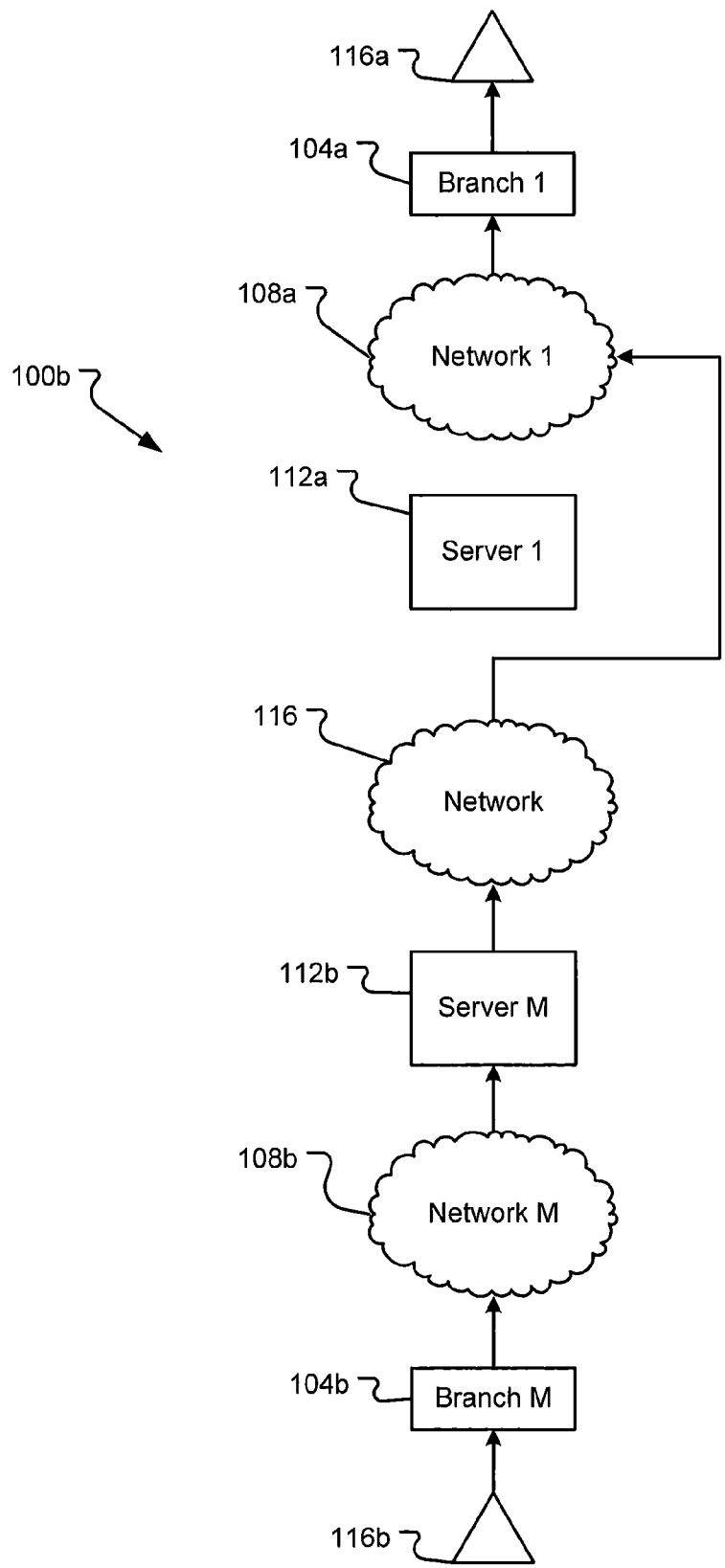
FIG. 1B is a block diagram of a communication in a communication system in accordance with at least some embodiments of the present invention.

In FIG. 1B, a communication is established according to at least one embodiment of the present invention. In particular, a communication is sent by sender 116b to recipient 116a. The communication is routed through the network 100b through server 112b, but not server 112a. The communication in FIG. 1B may be routed according to the distributed method of bandwidth allocation, described further below.

Figure 1C:
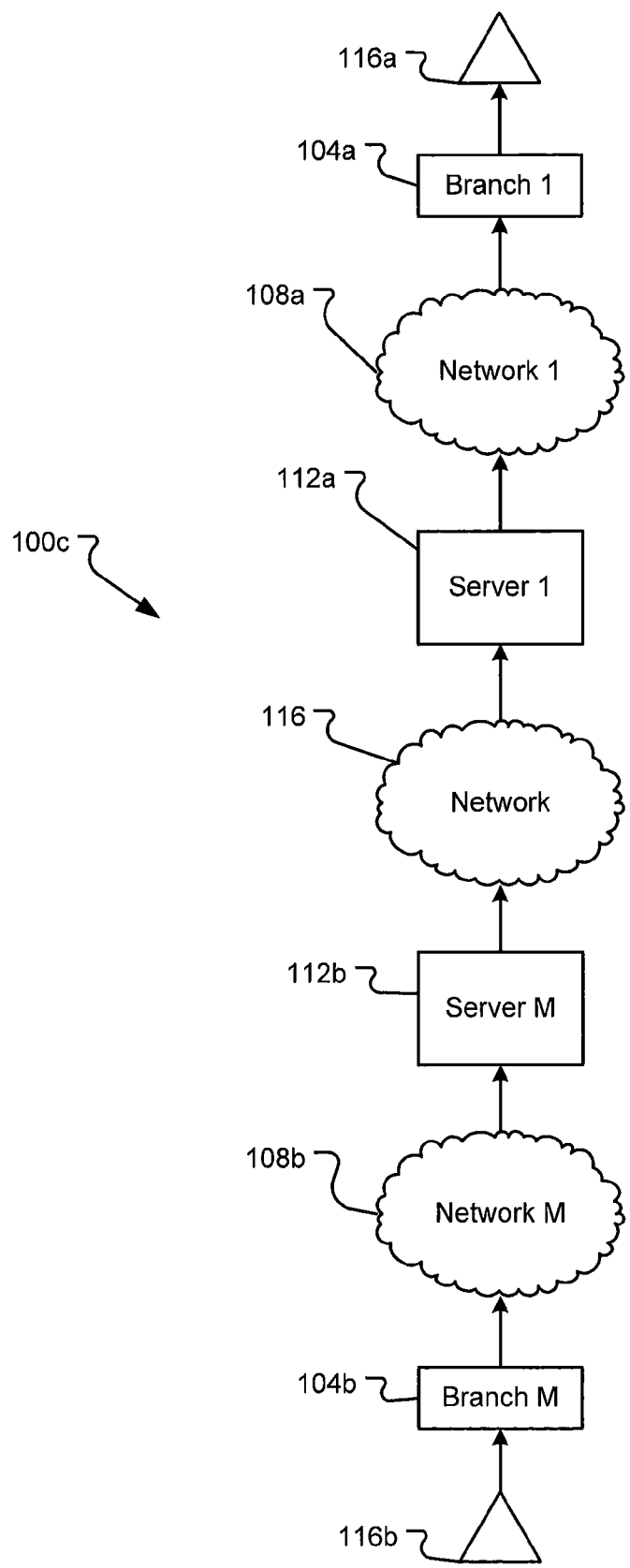
FIG. 1C is a block diagram of a communication in a communication system in accordance with at least some embodiments of the present invention.

In FIG. 1C, a communication is established according to at least one embodiment of the present invention. In particular, a communication is sent by sender 116*b* to recipient 116*a*. The communication is routed through the network 100*c* through servers 112*b* and 112*a*. The communication in FIG. 1C may be routed according to the authoritative method of bandwidth allocation, described further below. As will be appreciated, although only two servers 112 are depicted in FIGS. 1B & 1C, any server 112 may be connected to several other server 112. In addition, a server 112 connected to a plurality of branches 104 or servers 112 may manage communications to each according to either the decentralized or authoritative modes of bandwidth management, as will be discussed further below.

Figure 2:
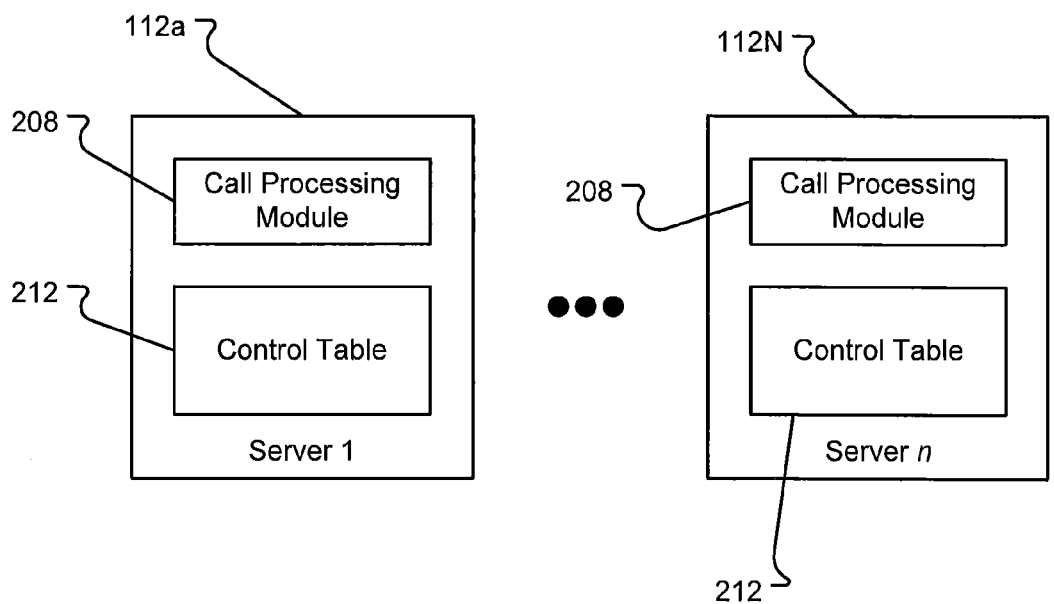
FIG. 2 is a block diagram of a series of servers in accordance with at least some embodiments of the present invention.

Referring now to FIG. 2, additional details of the servers 112*a*-N will be described in accordance with at least some embodiments of the present invention. According to some embodiments, each server 112 is a computer system as described elsewhere in this disclosure and known in the art. A server 112 may have one or more components, which may execute as computer modules. A computer module may execute according to instructions stored on, e.g., a computer readable medium, as may the other methods and algorithms disclosed herein. The server 112 can include one or more of, but is not limited to, a call processing module 208 and a local control table 212.

The call processing module 208 is utilized by the server 112 to administer or control calls for the server 112. The call processing module 208 may receive requests for phone calls and requests for other types of bandwidth consuming activities from an IP address of a server or a branch 104. The call processing module 208 may route such requests as required to complete the calls and other bandwidth consuming activities. However, according to various embodiments, the call processing module 208 first determines if the path to the destination site has adequate bandwidth to support the call or bandwidth consuming activity, e.g., whether the links across the origination and destination locations have sufficient bandwidth to support the communication. For example, according to at least one mode of operation, the call processing module 208 of the requesting server 112 is operable to check bandwidth across both the link from the originating site as well as the link to the destination site. According to at least another mode of operation, the call processing module 208 of the requesting server 112 checks the bandwidth across the link from the originating site, but not the bandwidth across the link to the destination site. If one or more communication links do not currently have a sufficient amount of bandwidth available to support the call or bandwidth consuming activity, the call processing module 208 may decline place the call or complete the bandwidth consuming activity. In some embodiments, the call processing module 208 may also function as a group administrator, or in an authoritative capacity, as explained hereinafter. According to further embodiments, the call processing module 208 may be configured to select, based on predefined criteria, among several routes to the destination location all having sufficient bandwidth to support the communication, as will be appreciated by those of skill in the art.

The control table 212 may be employed by the call processing module 208 to store information that allows the call processing module 208 to determine if sufficient bandwidth is available to place, or accept, a call or allow a bandwidth consuming activity to be executed. For any given server 112, some information in control table 212 may be maintained based on the activities performed by the local call processing module. This information may be synchronized and reconciled with other tables in other servers (e.g., the first server 112*a* may synchronize with all other servers 112*b*-N) during a synchronization step. When synchronization is triggered, information in each server's 112*a*-N table 212 may be updated according to utilization data known for a given communication link at some point in the past (i.e., at the time the synchronization was initiated). According to at least some embodiments, after synchronization, each server 112 generally continues to update information in control table 212 based on activities known to that server 112 until another synchronization occurs. In addition, various other data may be provided in control table 212 according to at least some embodiments of the present invention.

Figure 3:
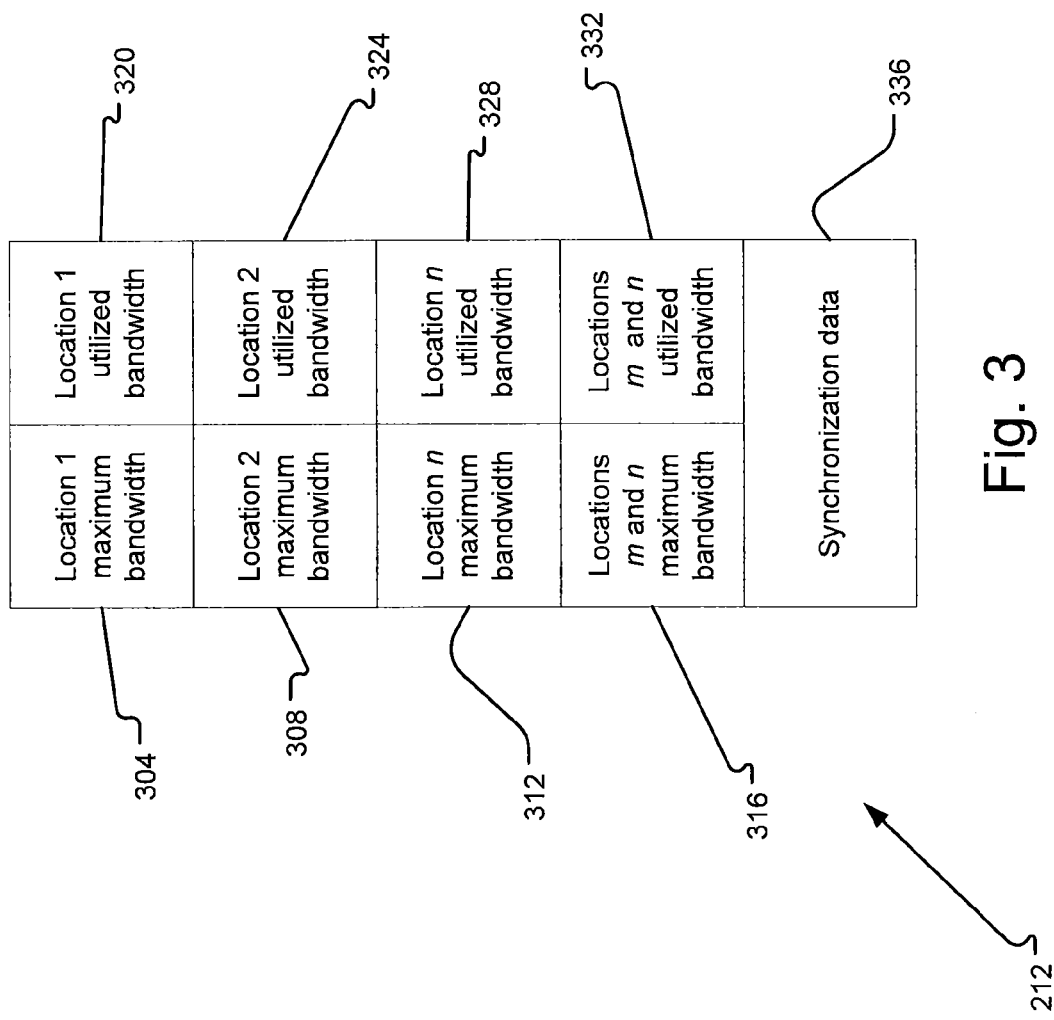
FIG. 3 is a block diagram of a data structure that is utilized in accordance with at least some embodiments of the present invention.

Referring now to FIG. 3, additional details of the control table 212 will be discussed in accordance with at least some embodiments of the present invention. Generally, each server 112*a*-N in the communication system 100 maintains and controls its own version of a control table 212, allowing each server 112 to separately monitor and coordinate bandwidth distribution on a number of communication links.

In accordance with at least some embodiments of the present invention, bandwidth management information may be maintained in each server's 112 control table 212. The control information maintained in a given control table 212 may comprise data fields 304, 308, 312, 316, 320, 324, 328, 332, and 336. There may be more or fewer fields than those shown in FIG. 3 comprising similar or different categories. As will be appreciated, the number of data fields may depend in part on the number of servers 112 and locations (i.e., branches 104 and communication networks 108 used to establish communication links) present in the system, as each server 112 in the network may be represented by one or more data fields. According to some embodiments, the one or more data fields may also represent networks, e.g., networks 108*a*-M or 116.

In accordance with at least some embodiments of the present invention, maximum bandwidth fields 304, 308, 312, and 316 reflect the maximum bandwidths associated with the respective locations and/or communication links of those locations. Further, in accordance with embodiments of the present invention, utilized bandwidth fields 320, 324, 328, and 332 store the current and locally known or estimated bandwidth values for the corresponding location or locations and/or communication links of those locations. According to some embodiments, as calls or other bandwidth consuming activities are started or completed at a location, the server 112 which was used to establish that call or bandwidth consuming activity may be configured to update the appropriate utilized bandwidth fields corresponding to the calling party and the destination location, as will be described further below. According to further embodiments, servers 112 may also update the appropriate utilized bandwidth fields during a synchronization process.

Synchronization data 336 may be maintained in the control table 212, or elsewhere on each server 112*a*-N. Synchronization data 336 may comprise information related to the generation and reception of synchronization messages, when such messages should be transmitted (e.g., the periodicity between synchronization processes and/or events that will trigger a synchronization process), when such messages should be expected from other servers 112, and/or the steps that should be performed by the server 112 when synchronization messages are received by the server 112. Synchronization messages may be shared during "audits" of bandwidth information between servers 112, and are explained in further detail below.

As will be appreciated, other values, measurements, and calculation results may be stored in the control table 212. By way of example, per call bandwidth, i.e. the amount of bandwidth needed for each call or bandwidth consuming activity, may also be provided in the control table 212. The per call bandwidth can include an average amount of bandwidth used per call or denote the highest historical bandwidth needed for a call. Quality of Service (QoS) information such as jitter, delay, and packet loss for a particular location or communication link servicing that location may also be stored in the control table 212. The QoS information may be utilized and referenced when determining certain bandwidth management thresholds (e.g., when determining whether to switch between a single authoritative bandwidth management mode and a decentralized bandwidth management mode). Further, some of the control information may be static having a stable value, whereas other control information is dynamic. The dynamic information may be computed periodically (for example, every day, every hour, etc.) or may be computed in response to an event (for example, a new call is received, a new member joins the server group, etc.). If a new server or device is established in the network, embodiments of the present invention contemplate transmitting information related to the device or links under its control via one or more synchronization messages.

Figure 4:
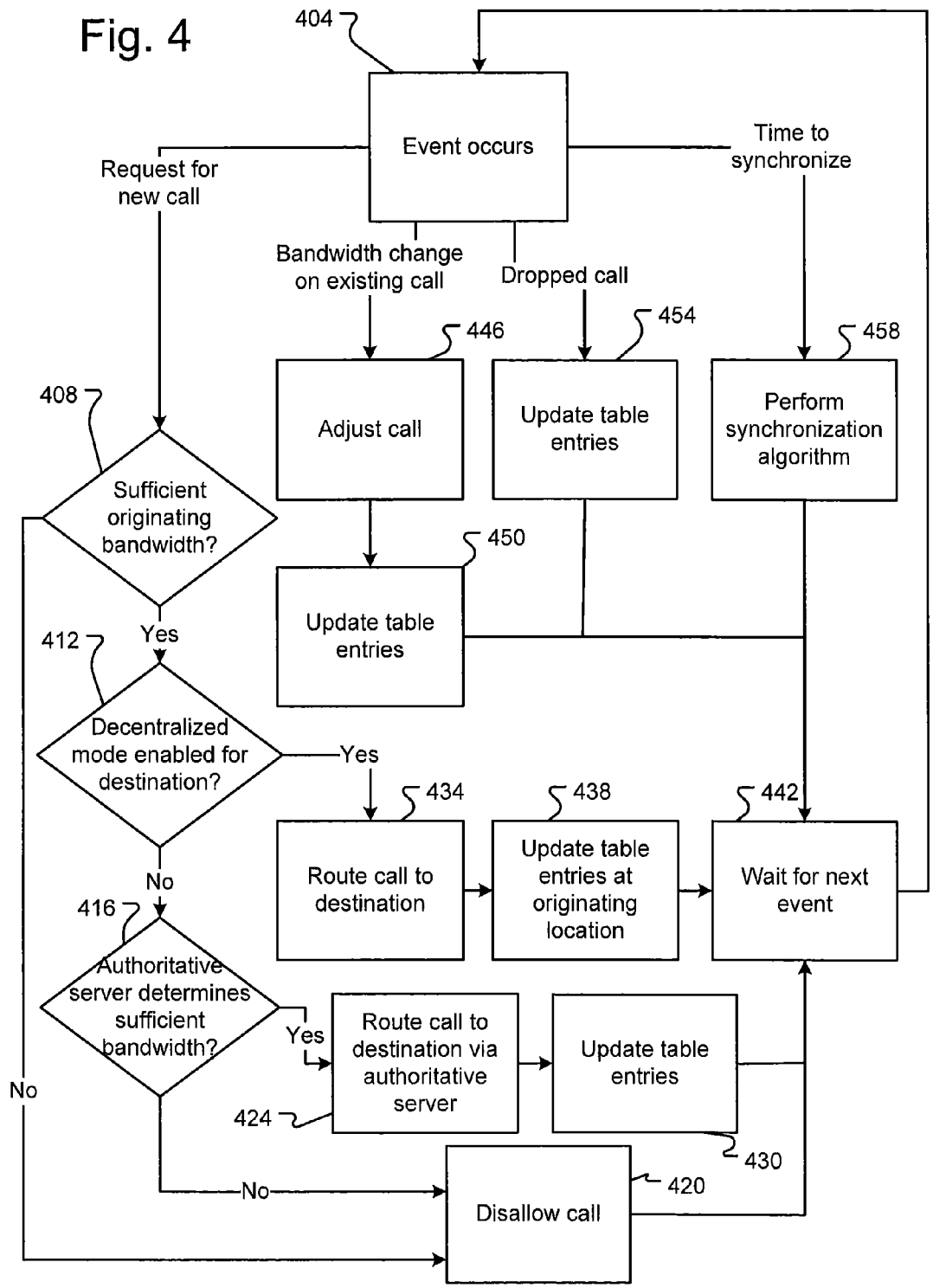
FIG. 4 is a flow diagram depicting a general bandwidth management method in accordance with at least some embodiments of the present invention.

Referring now to FIG. 4, an algorithm contemplating general bandwidth management will be described according to various embodiments of the present invention. Although FIG. 4 is illustrated in the context of a call being placed, it will be appreciated that the method is generally applicable to any bandwidth-consuming activity. In accordance with embodiments of the present invention, the method begins by an event occurring at a server 112 (step 404), which may be one or more of a call being requested, a request for a change in bandwidth, a call being dropped, or a time, condition, or request for synchronization occurring.

If a request for a new call is requested by a first server 112, the first server 112 may initially verify that sufficient originating bandwidth exists to place the call (step 408). By way of example, the server 112 may verify that adequate bandwidth is available at any point between the requesting branch 104 and the server 112 controlling the destination branch 104. Since the first server 112 is an outbound proxy, the first server is generally authoritative for the origination link, and may therefore assess the origination bandwidth. If sufficient originating bandwidth is not available, the first server 112 may disallow the call (step 420), and thereafter wait for another event (step 442).

If sufficient originating bandwidth is available, the first server may assess whether the decentralized or authoritative mode of operation is enabled for the destination (step 412). More specifically, by determining which mode is enabled, the first server 112 may determine whether to route the call without or with the assistance of an authoritative server 112 responsible in part for managing bandwidth at the destination of the call. In doing so, the first server 112 may consult its control table 212 to determine whether a threshold or other condition has been triggered which should cause the first server to route the call according to the authoritative mode of operation.

A threshold or condition may correspond to a situation where a predetermined amount of bandwidth (e.g., 100 Mb/s) or proportion of maximum available bandwidth (e.g., 80%, 85%, 90%, etc.) for a particular communication link is currently being used. Other types of thresholds or conditions may include receiving a request to establish a bandwidth consuming activity over the communication link where that bandwidth consuming activity is known to utilize a large amount of bandwidth or is expected to utilize a large fraction of the maximum or currently available bandwidth on that communication link.

If the first server determines that the threshold or condition has not been satisfied, then the call may be routed according to the decentralized mode of operation, e.g., without routing the call through an inbound authoritative server 112 (step 434). In general, the first server may then appropriately update the data fields in its control table 212 (step 438). Thereafter, the next event is awaited (step 442).

If, however, the first server determines that any of these first threshold conditions are satisfied (step 412), then the method continues by routing the call or activity according to the single authoritative bandwidth management scheme. During operation of the authoritative bandwidth algorithm, the first server 112 may request the authoritative server 112 to route the call or otherwise assist in the distribution or management of bandwidth. For example, the authoritative server 112 may verify that sufficient bandwidth exists (step 416), e.g., across the communication link or links between the authoritative server 112 and the destination 104. If the authoritative server 112 determines that insufficient bandwidth is available to route the call, the call is disallowed (step 420), and another event is awaited (step 442).

However, if the authoritative server determines that sufficient available bandwidth exists, the call is routed to the destination (step 424), with the data fields in the control table 212 of each of the first and authoritative servers 112 updated accordingly (step 430).

During the pendency of any call, a request for a change of bandwidth may be received by one or more servers 112. By way of illustration, participants of a voice call may wish to incorporate video data, e.g., a high definition video call requiring additional bandwidth. In the embodiment of FIG. 4, after a request for a change in bandwidth is received, the call or activity is adjusted accordingly (step 446), and the appropriate table entries are adjusted thereafter (step 450). However, it will be appreciated that the method of responding to a requesting for a bandwidth change on an existing call may be similar to the request for new call event described above. For example, after receiving a request for a bandwidth change, sufficient originating bandwidth may be assessed, followed by assessing the appropriate mode of operation, with the request denied or routed alternatively if adequate bandwidth does not exist, etc.

When a server 112 authorizes a session with a given bandwidth utilization, it is generally the responsibility of that same server 112 to detect the termination or demise of that session to decrement the appropriate data entry in control table 212. Also, in switching over to single authoritative mode, the responsibility to monitor and decrement the bandwidth used by the previously established generally remains with the server that initially authorized the session.

In addition, as described above, several conditions or occurrences may cause the servers 112 to synchronize accounting of bandwidth via a synchronization algorithm (step 458). The servers may thereafter continue to operate and wait for a new event (442). In accordance with at least some embodiments of the present invention, at various intervals, or upon the occurrence or non-occurrence of a condition, one or more servers 112 perform a synchronization or accounting audit. Specifically, the servers 112 will either individually or collectively first determine whether it is time to perform a synchronization process. If the server(s) 112 determine that a synchronization process is required, then the method continues with the servers 112 exchanging synchronization messages or similar signals.

The intervals that may be used to trigger when a synchronization process should occur may be periodic, non-periodic, random, pseudo-random, and the like. According to at least one embodiment, a server 112 may be operable to synchronize at a certain time of day, preferably when system traffic is historically off-peak. When synchronization occurs, one or more servers 112 may broadcast or communicate to the other servers 112 their own current bandwidth utilization accounting for one or more communication links or locations that are serviced by that server 112. The relevant field or fields in each receiving server's control table 212 may then be updated appropriately with the new information.

Synchronization messages may comprise a variety of information. According to at least some embodiments of the present invention, a synchronization message provides information related to a server's own accounting of available bandwidth for one or a number of communication links at a given time. Although such an estimate may not be an instantaneous measure of bandwidth availability given lags in measurement and transmission, the estimate should accurately reflect bandwidth availability at some past time. As will be appreciated, the lapsed time between measurement of available bandwidth and communication of the data to another server 112 may, if desired, be estimated based on one or more factors known to those of skill in the art. According to further embodiments, the frequency of the auditing or synchronization process may be determined by the call rate or average utilization for the destination location; thus, the frequency of the synchronization process may dynamically change based upon the current or average call rate for that location. Furthermore, some locations may require a more frequent execution of the synchronization than other locations, particularly where the call rates vary greatly between locations.

After the synchronization processes has completed, each server's accounting of available or utilized bandwidth for a particular communication link or location is exactly the same and accurate with reference to the point in time where the synchronization process was initiated. Also, after synchronization has occurred, the servers 112 may be allowed to continue maintaining their own independent accounting of bandwidth utilization for various communication links or locations.

In some embodiments, when one server 112 determines that the first threshold or condition has been met for a particular location, that server 112 may send an announcement to any other server 112 adapted to route calls to that location, where the announcement indicates that all servers 112 should enter the single authoritative bandwidth management scheme for the identified location. In some embodiments, this determination may be made automatically by all servers 112 immediately after a synchronization process occurs and each server 112 independently but substantially simultaneously determines that the first threshold or condition has been met. In some embodiments, an authoritative server 112 for a particular location may be adapted to monitor the current available bandwidth calculations determined at each server 112 by requesting such information from these servers on a periodic basis. If the authoritative server 112 determines that one of the other servers 112 routing calls over the monitored location has computed a currently available bandwidth that satisfies the first threshold or condition, then the authoritative server 112 may announce to all other servers 112 that the single authoritative bandwidth management scheme should be invoked until further notice.

The first server 112 may route additional calls to the destination determined to be in authoritative mode until a second threshold condition has occurred. By way of example, the second threshold could be that available bandwidth has fallen below 80% of the corresponding maximum bandwidth. It will be appreciated that the first and second thresholds need not be the same value; rather, according to some embodiments, it may be preferable to have the bandwidth utilization value or proportion less of the second threshold condition be less than the value of the first threshold condition. For example, using such unequal thresholds may prevent instability and excessive switching between single authoritative and decentralized modes of operation. In addition, the first and second predetermined conditions need not be limited to bandwidth utilization thresholds, but could comprise, e.g., certain times of day or days of week, failure or congestion in a part of the network, and the like. The switch between decentralized and authoritative modes of operation may be made at the time the next call is placed to the destination, or it may be made dynamically during a call, i.e., the mode of operation may be changed during the pendency of the call.

The method of FIG. 4 and other methods described herein are generally implemented on a per-location basis, meaning that each location or communication link to a particular location may be managed individually according to the mechanisms discussed herein. For example, a single server 112 may be adapted to route calls and establish other bandwidth consuming activities for two or more communication links for two or more branches 104. In some embodiments, a first communication link may be managed according to a decentralized mode while a second communication link may be managed according to a single authoritative mode. By way of example, the first communication link may not require careful bandwidth management in a single authoritative mode if the first communication link does not currently have a large proportion of its maximum available bandwidth being consumed. The second communication link, on the other hand, may have a large proportion (e.g., more than 90%) of its maximum available bandwidth currently being consumed, in which case it may be desirable to implement a single authoritative mode of bandwidth management. If this situation occurs, a server 112 may route calls over the first communication link according to a decentralized mode of operation while routing calls over the second communication link according to a single authoritative mode of operation.

Figure 5:
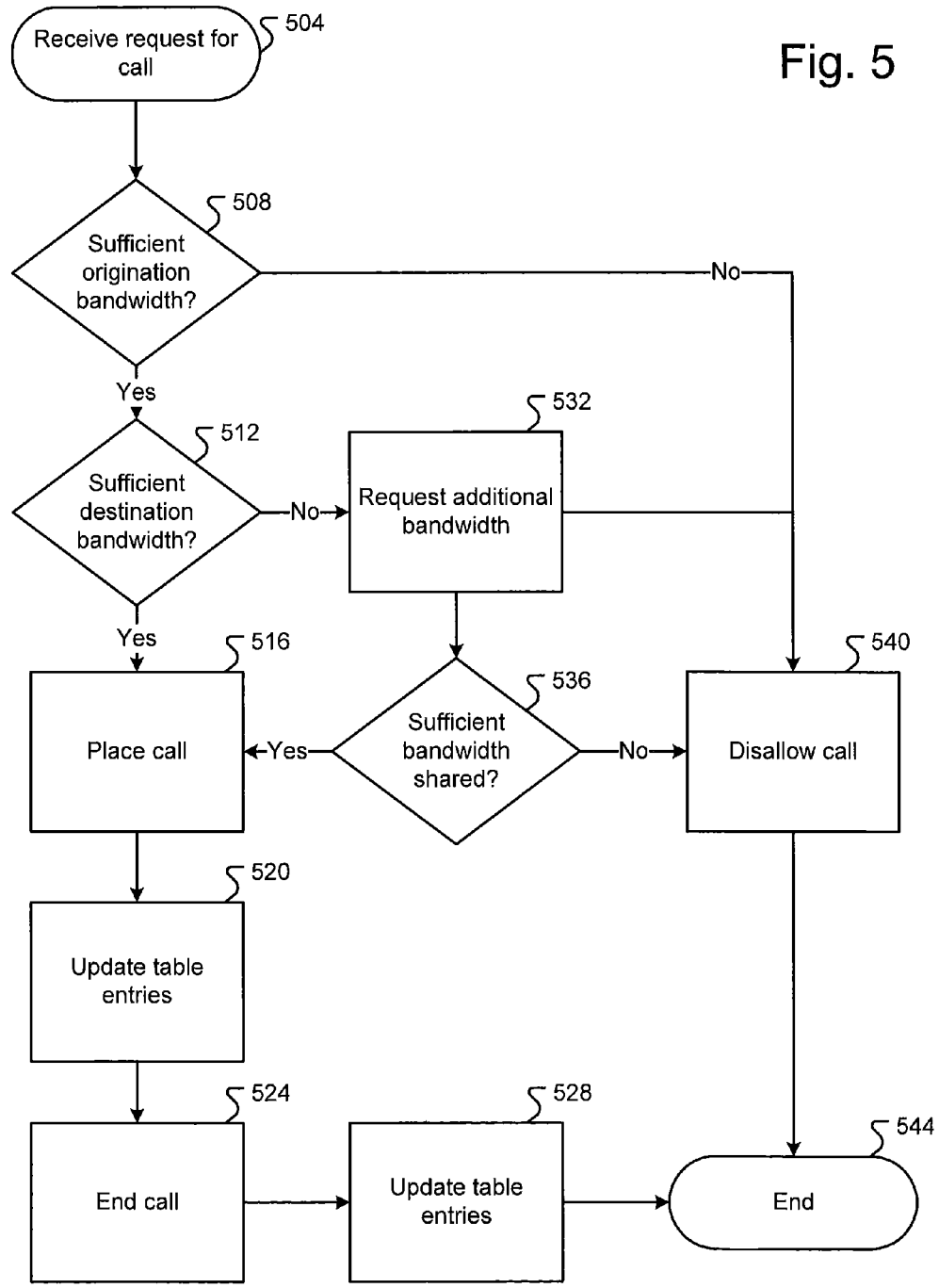
FIG. 5 is a flow diagram depicting a method of managing bandwidth utilization in accordance with at least some embodiments of the present invention.

Referring now to FIG. 5, a further embodiment is depicted. In particular, FIG. 5 shows a method for placing a call or other bandwidth consuming activity, wherein the call is routed either according to a decentralized method or a shared method of bandwidth management, e.g., the method described in the '714 patent application. It will be appreciated that the method of FIG. 5 may be viewed as another event in step 404 of the method of FIG. 4, or that various features of the embodiment of FIG. 4 may be incorporated into FIG. 5.

According to the embodiment of this method, a request for a call or other bandwidth consuming activity is received at a first server 112 (step 504). The request will include origination and destination addresses that can be analyzed by the call processing module 208. Once the call processing module 208 has identified the desired destination location, the call processing module 208 continues by referencing a local control table 212 to check the bandwidth available in a portion or portions of the network. The first server 112 first verifies if sufficient bandwidth is present over the originating links (step 508). If the first server does not determine that adequate bandwidth across the origination links exists, then the call is disallowed (step 540), or routed according to an alternate communication link (not depicted).

If sufficient origination bandwidth is determined to exist, then the server 112 may then consult its control table 212 to determine if sufficient bandwidth to support the call exists at the destination (step 512). According to some embodiments, if the control table 212 of the first server 112 does not reflect adequate destination bandwidth, the first server may request a second server 112 to share some or all of the bandwidth allocated to the second server 112 (step 532). If sufficient bandwidth is not shared, the first server 112 may disallow the call (step 540) or, according to further embodiments, may again request bandwidth from another server 112, or after waiting a predetermined amount of time, or after waiting until the occurrence of another condition, such as another call being dropped (not depicted).

If the first server 112 determines in step 512 or 536 that sufficient destination bandwidth is available, the first server 112 may place the call (step 516). As will be appreciated, the call at this point may be routed according to either the decentralized or authoritative mode, as described above, with control table 212 entries thereafter updated appropriately (step 520) and in conformance with any of the above methods and descriptions.

More specifically, the call processing module 208 may update the available or utilized bandwidth field in its control table 212 corresponding to the origination and/or destination location. This update is performed only on the locally maintained table. At this point no other servers 112 in the communication system 100 will receive an indication that a new bandwidth consuming activity has been established over the communication link of the destination location. Thus, the value in the updated field of the server 112 that completed the request will reflect an estimation of available bandwidth, specifically since this server 112 will not be aware of other calls that have been established over the same communication link by other servers 112 since that field was last synchronized. As time progresses, each server's accounting of total available or utilized bandwidth will continue to differ, perhaps by varying degrees, at least until a synchronization process is performed.

According to embodiments of the present invention, as the call processing modules 208 continue to independently monitor and manage bandwidth utilization, the call processing modules 208 determine whether a call or other type of bandwidth consuming activity previously established on the communication link by that call processing module 208 has been torn down (step 524).

It is therefore apparent that there have been provided, in accordance with the present invention, methods, systems, and devices for allocating and managing bandwidth and bandwidth consuming activities. While this invention has been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this invention.

What is claimed is:

1. A method, comprising:
   receiving, at a first server, a request from a communication device to establish a communication session over a communication link thereby utilizing bandwidth of the communication link, wherein the communication link comprises a maximum available bandwidth;
   updating, by the first server, an accounting of currently available bandwidth for the communication link in a locally maintained control table; and
   performing, by the first server, a synchronization process, wherein during the synchronization process the first server shares its accounting of currently available bandwidth for the communication link with a second server that is also capable of establishing communication sessions over the communication link, wherein while operating in a decentralized mode of bandwidth management and other than during the synchronization process the first server does not share its accounting of currently available bandwidth for the communication link with the second server and the second server does not share its accounting of currently available bandwidth for the communication link with the first server, wherein the synchronization process comprises one or more of the following:
   the first server transmitting to the second server a first synchronization message, wherein the first synchronization message includes the first server's accounting of currently available bandwidth for the communication link and a time at which the accounting was determined;
   the first server receiving from the second server a second synchronization message, wherein the second synchronization message includes the second server's accounting of currently available bandwidth for the communication link and a time at which the accounting was determined;
   the first server reconciling its accounting of currently available bandwidth for the communication link when the synchronization process was initiated with the second server's accounting of currently available bandwidth for the communication link when the synchronization process was initiated and then transmitting a third synchronization message to the second server indicating results of the determined reconciliation; and
   the second server reconciling its accounting of available bandwidth for the communication link when the synchronization process was initiated with the first server's accounting of available bandwidth for the communication link when the synchronization process was initiated and then transmitting a fourth synchronization message to the first server indicating results of the determined reconciliation.

2. The method of claim 1, further comprising:
   determining, by the first server, that a communication session previously established over the communication link by the first server has been torn down;
   updating, by the first server, the accounting of currently available bandwidth for the communication link in the locally maintained control table.

3. The method of claim 1, further comprising:
   determining, by the first server, that a first threshold condition has been met; and
   in response to determining that the first threshold condition has been met, transitioning from the decentralized mode of bandwidth management to a single authoritative mode of bandwidth management.

4. The method of claim 3, wherein while the communication link is managed according to the single authoritative mode of bandwidth management a second communication link is managed by the first server according to a decentralized mode of bandwidth management.

5. The method of claim 3, wherein during the single authoritative mode of bandwidth management the first server forwards requests to establish communication sessions over the communication link to an authoritative server and wherein the authoritative server is responsible for maintaining an accounting of available bandwidth for the communication link.

6. The method of claim 3, further comprising:
determining, by an authoritative server, that a second threshold condition has been met; and
in response to determining that the second threshold condition has been met, transitioning from the single authoritative mode of bandwidth management to the decentralized mode of bandwidth management, wherein during the transition from the single authoritative mode of bandwidth management to the decentralized mode of bandwidth management the authoritative server provides its accounting of available bandwidth for the communication link with the first server.

7. The method of claim 1, wherein the first server's accounting of available bandwidth for the communication link is based on the maximum available bandwidth for the communication link and an amount of bandwidth consumed by communication sessions established over the communication link by only the first server.

8. The method of claim 1, wherein the communication session comprises one or more of a voice call, a video call, a data call, and a Virtual Private Network connection.

9. A communication system, comprising:
a first server adapted to establish communication sessions over a communication link to a first location, wherein the communication link comprises a maximum available bandwidth;
a second server adapted to establish communication sessions over the communication link;
wherein both the first and second servers are adapted to individually maintain an accounting of currently available bandwidth for the communication link in locally maintained control tables, wherein the first server's accounting of currently available bandwidth for the communication link is based on the maximum available bandwidth for the communication link and an amount of bandwidth consumed by communication sessions established over the communication link by only the first server, and wherein the second server's accounting of currently available bandwidth for the communication link is based on the maximum available bandwidth for the communication link and an amount of bandwidth consumed by communication sessions established over the communication link by only the second server; and
wherein execution of a synchronization process comprises one or more of the following operations:
the first server transmitting to the second server a first synchronization message, wherein the first synchronization message includes the first server's accounting of currently available bandwidth for the communication link and a time at which the accounting was determined;
the first server receiving from the second server a second synchronization message, wherein the second synchronization message includes the second server's accounting of currently available bandwidth for the communication link and a time at which the accounting was determined;
the first server reconciling its accounting of currently available bandwidth for the communication link when the synchronization process was initiated with the second server's accounting of currently available bandwidth for the communication link when the synchronization process was initiated and then transmitting a third synchronization message to the second server indicating results of the determined reconciliation; and the second server reconciling its accounting of available bandwidth for the communication link when the synchronization process was initiated with the first server's accounting of available bandwidth for the communication link when the synchronization process was initiated and then transmitting a fourth synchronization message to the first server indicating results of the determined reconciliation.

10. The system of claim 9, wherein while operating in a decentralized mode of bandwidth management and other than during a synchronization process the first server does not share its accounting of currently available bandwidth for the communication link with the second server and the second server does not share its accounting of currently available bandwidth for the communication link with the first server.

11. The system of claim 10, wherein the synchronization process is performed on a periodic basis.

12. The system of claim 11, wherein the frequency with which the synchronization process is performed varies according to a call rate of the communication link.

13. The system of claim 9, wherein the first server is further operable to determine that a communication session previously established over the communication link by the first server has been torn down and update its accounting of currently available bandwidth for the communication link in its locally maintained control table.

14. The system of claim 9, wherein at least one of the first and second server is adapted to determine that a first threshold condition has been met and in response to determining that the first threshold condition has been met, transition from a decentralized mode of bandwidth management to a single authoritative mode of bandwidth management.

15. The system of claim 14, wherein while the communication link is managed according to the single authoritative mode of bandwidth management a second communication link is managed by the first server according to the decentralized mode of bandwidth management.

16. The system of claim 14, wherein during the single authoritative mode of bandwidth management the first server forwards requests to establish communication sessions over the communication link to the second server and wherein the second server is an authoritative server that is responsible for maintaining an accounting of available bandwidth for the communication link.

17. The system of claim 14, wherein the second server operates in the single authoritative mode of bandwidth management as an authoritative server and is further operable to determine that a second threshold condition has been met, wherein the second threshold condition is different from the first threshold condition, and wherein the second server is further operable, in response to determining that the second threshold condition has been met, transition from the single authoritative mode of bandwidth management to the decentralized mode of bandwidth management, wherein during the transition from the single authoritative mode of bandwidth management to the decentralized mode of bandwidth management the authoritative server provides its accounting of available bandwidth for the communication link with the first server.

18. The system of claim 9, wherein the communication session comprises one or more of a voice call, a video call, a data call, and a Virtual Private Network connection.

* * * * *